(12) United States Patent
Hillesund et al.

(10) Patent No.: US 9,453,931 B2
(45) Date of Patent: Sep. 27, 2016

(54) METHODS AND SYSTEMS FOR STREAMER ANTI-TWIST

(71) Applicant: PGS Geophysical AS, Lysaker (NO)

(72) Inventors: Øyvind Hillesund, Nesbru (NO);
Gustav Goran Mattias Südow, Houston, TX (US)

(73) Assignee: PGS Geophysical AS, Oslo (NO)

( * ) Notice: Subject to any disclaimer, the term of this patent is extended or adjusted under 35 U.S.C. 154(b) by 224 days.

(21) Appl. No.: 14/145,349

(22) Filed: Dec. 31, 2013

(65) Prior Publication Data

US 2015/0016217 A1    Jan. 15, 2015

Related U.S. Application Data

(60) Provisional application No. 61/844,649, filed on Jul. 10, 2013.

(51) Int. Cl.
*G01V 1/38*    (2006.01)

(52) U.S. Cl.
CPC ............ *G01V 1/3826* (2013.01); *G01V 1/3835* (2013.01)

(58) Field of Classification Search
CPC .................... G01V 1/3826; G01V 1/3835
USPC ............................................. 367/15
See application file for complete search history.

(56) References Cited

U.S. PATENT DOCUMENTS

| | | |
|---|---|---|
| 6,525,992 B1 | 2/2003 | Olivier et al. |
| 6,691,038 B2 | 2/2004 | Zajac |
| 6,932,017 B1 | 8/2005 | Hillesund et al. |
| 7,080,607 B2 | 7/2006 | Hillesund et al. |
| 7,142,481 B1 | 11/2006 | Metzbower et al. |
| 7,145,833 B1 | 12/2006 | Hoogeveen |
| 7,162,967 B2 | 1/2007 | Hillesund et al. |
| 7,167,412 B2 | 1/2007 | Tenghamn |
| 7,222,579 B2 | 5/2007 | Hillesund et al. |
| 7,293,520 B2 | 11/2007 | Hillesund et al. |
| 7,926,614 B2 | 4/2011 | Tenghamn et al. |
| 8,230,801 B2 | 7/2012 | Hillesund et al. |
| 8,483,008 B2 | 7/2013 | Welker |
| 2008/0046214 A1* | 2/2008 | Fowler .................. G01C 17/38 702/150 |
| 2010/0202251 A1* | 8/2010 | Ozdemir et al. ......... G01V 1/36 367/24 |
| 2010/0307402 A1 | 12/2010 | Rinnan et al. |
| 2011/0279120 A1 | 11/2011 | Sudow et al. |
| 2012/0095629 A1 | 4/2012 | Fjellstad et al. |
| 2012/0222709 A1 | 9/2012 | Karlsen et al. |
| 2013/0025362 A1 | 1/2013 | Sudow et al. |
| 2013/0044565 A1 | 2/2013 | Barr et al. |

OTHER PUBLICATIONS

McBarnet, Andrew, Moving up the Q, OffShore Engineer, Jun. 2008, pp. 30-32.

Bunting, Tim, Extending the Range and Geographical Applicability of the Q-Marine Solution, PESA News, Apr./May 2009, pp. 38-39.

(Continued)

*Primary Examiner* — Daniel L Murphy

(57) ABSTRACT

Disclosed are methods and systems for enabling anti-twist functionality in marine geophysical streamers. An embodiment discloses a method comprising: towing a streamer behind a survey vessel in a body of water, wherein the streamer comprises rotation sensors and streamer rotation devices; receiving data from at least one rotation sensor indicative of streamer twist; and rotating a portion of the streamer with at least one streamer rotation device to reduce the streamer twist based, at least in part on the data.

20 Claims, 4 Drawing Sheets

(56) References Cited

OTHER PUBLICATIONS eBird: Lateral Steering and Depth Control of Seismic Streamers, Product Data Sheet, Kongsberg Seatex AS, Oct. 2009.

Q-Marine: Imaging the Invisible—Repeatably, Data Sheet, WesternGeco, Dec. 8, 2011.

European Extended Search report mailed on Dec. 14, 2015, in the prosecution of patent application 14174893.9, 7 pages.

* cited by examiner

METHODS AND SYSTEMS FOR STREAMER ANTI-TWIST

CROSS-REFERENCE TO RELATED APPLICATIONS

The present application claims priority to U.S. Provisional Application No. 61/844,649, filed Jul. 10, 2013, the entire disclosure of which is incorporated herein by reference.

BACKGROUND

Embodiments relate generally to the field of marine geophysical surveying and, more particularly, embodiments relate to methods and systems for enabling anti-twist functionality in marine geophysical streamers.

Techniques for geophysical surveying include marine geophysical surveying, such as seismic surveying and electromagnetic surveying, in which geophysical data may be collected from below the Earth's surface. Geophysical surveying has applications in mineral and energy exploration and production to help identify locations of hydrocarbon-bearing formations. Certain types of marine geophysical surveying, such as seismic or electromagnetic surveying, may include towing an energy source at a selected depth— typically above the seafloor—in a body of water. One or more geophysical streamers also may be towed in the water at selected depths—typically above the seafloor—by the same or a different vessel. The streamers are typically cables that include a plurality of sensors disposed thereon at spaced apart locations along the length of the cable. Some geophysical surveys locate sensors on ocean bottom cables or nodes in addition to, or instead of, streamers. The sensors may be configured to generate a signal that is related to a parameter being measured by the sensor. At selected times, the energy source may be actuated to generate, for example, seismic or electromagnetic energy that travels downwardly into the subsurface rock. Energy that interacts with interfaces, generally at the boundaries between layers of rock formations, may be returned toward the surface and detected by the sensors on the streamers. The detected energy may be used to infer certain properties of the subsurface rock, such as structure, mineral composition and fluid content, thereby providing information useful in the recovery of hydrocarbons.

Some known streamers may be based on a dual strain member mechanical backbone. This implementation may be well suited for the in-line tension and reeling requirements of current systems. However, the dual strain member implementation typically has little torsion stiffness, which enables the streamer to rotate (almost) freely around its center axis (also referred to herein as "twist"). Other streamer designs (e.g., sensor stress member streamers) may also have little torsion stiffness also allowing streamer rotation. Such rotation may have severe mechanical and robustness consequences.

Devices used in the control of streamer orientation and/or position may include lateral force and depth (LFD) control devices, also referred to as "birds." LFD control devices may be used for changing the orientation and/or position of the streamer. In one example, LFD control devices may include variable incidence wings that are rotatably fixed onto the streamer. While LFD control devices have been used in controlling the orientation and/or position of streamers, some LFD control devices have been observed to have non-optimal anti-twist functionality, leaving remnant twist in streamer sections. For example, FIG. 1 illustrates a streamer section 2 with a nearly 100° twist between adjacent spacers 4, which may be caused due to malfunction of a LFD control device.

Accordingly, there is a need for improved methods and systems for detecting and removing streamer twist.

BRIEF DESCRIPTION OF THE DRAWINGS

These drawings illustrate certain aspects of some of the embodiments of the present invention and should not be used to limit or define the invention.

DETAILED DESCRIPTION

It is to be understood the present disclosure is not limited to particular devices or methods, which may, of course, vary. It is also to be understood that the terminology used herein is for the purpose of describing particular embodiments only, and is not intended to be limiting. Although individual embodiments are discussed, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Embodiments relate to methods and systems for enabling anti-twist functionality (i.e., reducing rotation around its center axis) in marine geophysical streamers. In some embodiments, anti-twist functionality may be provided by way of lateral force and depth (LFD) control devices. In some embodiments, anti-twist functionality may be operated independently of any other functionality present in the LFD control devices. Some embodiments include the use of a direct measurement of the streamer twist, rather than relying on an assumed initial ideal state. Accordingly, it may offer various advantages over known streamer anti-twist solutions. By way of example, present embodiments may include direct measurement of the actual streamer twist, which may typically only be estimated in the anti-twist and unwind systems employed in known streamer rotation devices and streamer control systems.

Figure 2:
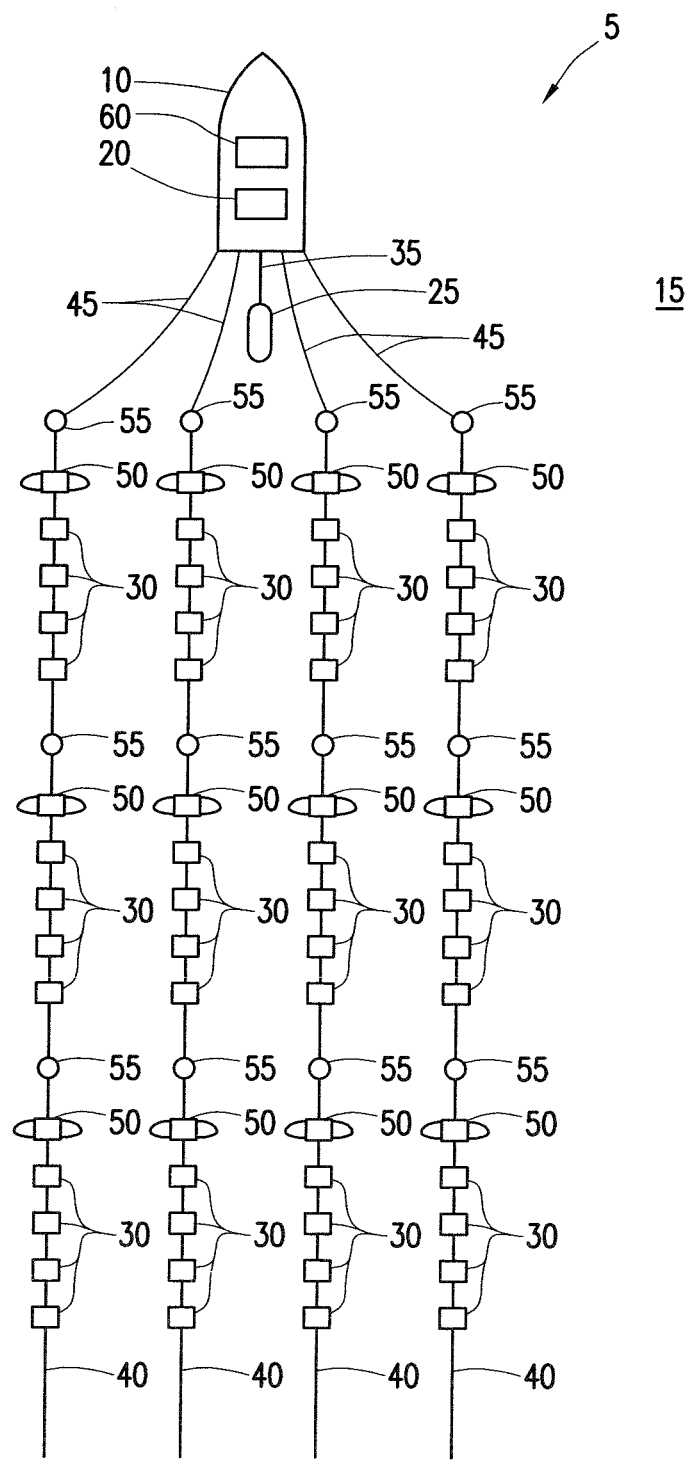
FIG. 2 shows an example marine geophysical survey system with a streamer having rotation sensors.

FIG. 2 illustrates a marine geophysical survey system 5 in accordance with embodiments of the present invention. In the illustrated embodiment, the marine geophysical survey system 5 may include a survey vessel 10 that moves along the surface of a body of water 15, such as a lake or ocean.

The survey vessel 10 may include thereon equipment, shown generally at 20 and referred to for convenience as a "recording system." The recording system 20 typically includes devices (none shown separately) for navigating the survey vessel 10, such as global positioning system ("GPS") receivers, actuating one or more energy sources 25, and recording signals generated by geophysical sensors 30.

As illustrated, the survey vessel 10 or a different vessel (not shown) can tow a source cable 35 that includes one or more energy sources 25. The one or more energy sources 25 may be towed above the water bottom. The one or more energy sources 25 may be any selectively actuable sources suitable for marine geophysical surveying, including without limitation seismic air guns, water guns, vibrators, electromagnetic field transmitters, or arrays of such devices. In some embodiments, seismic energy and/or electromagnetic energy may originate from the one or more energy sources 25. As the energy is emitted by the energy sources 25, it travels downwardly through the body of water 15 and rock formations (not shown) below the water bottom. It should be noted that, while the present example shows only a single energy source 25, the invention is applicable to any number of energy sources towed by survey vessel 10 or any other vessel.

The geophysical survey system 5 may include a plurality of streamers 40 towed by the survey vessel 10 (or another vessel) with each of the streamers 40 including the geophysical sensors 30 at spaced apart locations. The streamers 40 may be towed above the water bottom. The streamers 40 may be spaced apart laterally, vertically, or both laterally and vertically. "Lateral" or "laterally," in the present context, means transverse to the direction of the motion of the survey vessel 10. The streamers 40 may each be formed, for example, by coupling a plurality of streamer sections end-to-end as explained in U.S. Pat. No. 7,142,481, the disclosure of which is incorporated herein by reference. The streamers 40 may be coupled at their forward end (with respect to direction of movement of the survey vessel 10) to corresponding lead-in lines 45. While not shown, each of the lead-in lines 45 may be deployed from the survey vessel 10 by a winch or other similar spooling device, for example, that can be used to control the deployed length of the lead-in lines 45. It should be noted that, while the present example, shows only four streamers 40, the invention is applicable to any number of streamers 40 towed by survey vessel 10 or any other vessel. For example, in some embodiments, eight or more streamers 40 may be towed by survey vessel 10, while in other embodiments, as many as twenty-six or more streamers 40 may be towed by survey vessel 10.

The geophysical sensors 30 may be any type of geophysical sensor known in the art. Non-limiting examples of such sensors may include seismic sensors such as geophones, hydrophones, or accelerometers, or electromagnetic field sensors, such as electrodes or magnetometers. By way of example, the geophysical sensors 30 may generate response signals, such as electrical or optical signals, in response to detecting energy emitted from the one or more energy sources 25 after the energy has interacted with the rock formations (not shown) below the water bottom. Signals generated by the geophysical sensors 30 may be communicated to the recording system 20.

In accordance with an embodiment, a geophysical data product indicative of certain properties of the subsurface rock may be produced from the detected energy. The geophysical data product may include processed seismic or electromagnetic geophysical data and may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis may be performed on the data product.

The streamers 40 may further include streamer rotation devices 50. As illustrated, the streamer rotation devices 50 may be disposed on the streamers 40 at spaced apart locations. In some embodiments, the streamer rotation devices 50 may have a spacing of about 200 meters to about 400 meters. Each streamer rotation device 50 may provide rotational torque to cause its rotation, and likewise rotation of the portion of the streamer 40 adjacent to the streamer rotation device 50. The streamer rotation devices 50 may also be used, for example, in the regulation of the streamer depth and streamer lateral positioning. In addition to regulation of depth and streamer lateral position, the streamer rotation devices 50 may also contain devices that output roll count and/or force data. In some embodiments, existing lateral force and depth (LFD) control devices may be used as streamer rotational devices. The LFD control devices may be any of a variety of different devices suitable for changing streamer orientation and/or position, including "birds" having variable-incidence wings. In one example, streamer rotation devices 50 may include variable incidence wings that are rotatably fixed onto the streamer. Examples of suitable streamer rotation devices 50 are disclosed in U.S. Pat. No. 6,525,992 and U.S. Pat. No. 6,932,017. An example of a LFD control device that would be a suitable streamer rotation device 50 is the Q-Fin lateral steering unit, available from WesternGeco, Houston, Tex.

Figure 7:
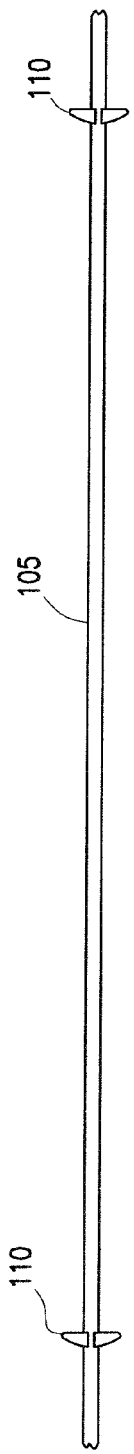
FIG. 7 shows a prior art streamer having a pair of LFD devices.

Ideally, the streamers 40 operate free of twist. However, a streamer 40 often may rotate around its center axis (i.e., twist) during deployment, operation, or retrieval. Accordingly, the streamers 40 may include a distributed network of rotation sensors 55 at spaced apart locations so streamer twist can be deter wined at various locations along the streamer 40. Using the determined streamer twist, the streamer rotation devices 50 may be rotated to counteract the streamer twist. The distributed network of rotation sensors 55 may also be used to enable verification of this anti-twist rotation implemented by the streamer rotation devices 50. In addition, a controlled roll or twist may also be introduced into a particular streamer 40 using the streamer rotation devices 50 and rotation sensors 55 as a means for characterizing the achieved twist. In contrast, systems used previously have typically only been able to count the number of rotations at the streamer rotation devices 50 themselves with no way for characterization of streamer twist between streamer rotation devices 50. For example, FIG. 7 illustrates a prior art streamer 105 comprising a pair of LFD control devices 110. In operation, the LFD control devices 110 may be configured to provide a roll count. In other words, each LFD control device 110 may measure the number of 360-degree rotations at the particular LFD control device 110. However, the rotation of the streamer 105 or a characterization thereof between the LFD control devices 110 is not determined or otherwise known.

Figure 8:
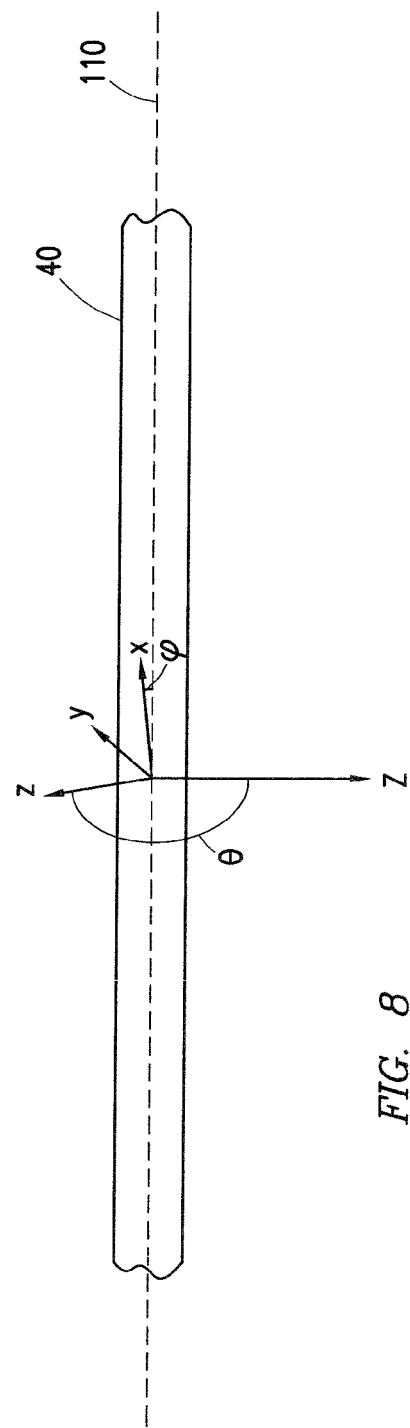
FIG. 8 illustrates the coordinate system for a particular rotation sensor.

Each rotation sensor 55 has an output that is representative of, or can be processed to determine, the orientation of the corresponding streamer 40 at the particular rotation sensor 55 with respect to the streamer's longitudinal axis. For example, the rotation sensors 55 may be used to measure rotation of the corresponding streamer 40 about its longitudinal axis. In one embodiment, the rotation sensors 55 may include a vector sensor, such as 2- or 3-axis vector sensors. In some embodiments, the vector sensors may be orientation or tilt sensors, which may measure angles of slope and/or inclination of the corresponding streamer 40 with respect to Earth's gravity. Tilt sensors may also be referred to as "inclinometers." In an embodiment, the rotation sensors 55 may measure the roll angle of the corresponding streamer 40 about its longitudinal axis. The roll angle θ is shown on FIG. 8. The local coordinate system (x, y, z) for a particular rotation sensor 55 is shown on FIG. 8. In the illustration on FIG. 8, the roll angle θ is the angle of rotation about longitudinal axis 110 of the streamer 40 between the global Z-axis (Z) and the local z-axis (z). Examples of suitable vector sensors may include accelerometers or magnetoresistive sensors, either of which may be DC-coupled to measure the Earth's magnetic field or the Earth's gravity. In particular embodiments, the rotation sensors 55 may be micro-electrical mechanical systems (MEMS) rotation sensors. In particular embodiments, the rotation sensors 55 may be a MEMS accelerometer. For example, the output of the MEMS accelerometer (or other accelerometer) may be processed to give the streamer twist. The accelerometer may measure the projection of gravity vector along the sensing axis. In some embodiments, a 2-axis accelerometer may provide a measurement of linear acceleration along the x- and y-axes. In some embodiments, a 3-axis accelerometer may provide a measurement of linear acceleration along the x-, y-, and z-axes. Because the force of gravity is known and always acts towards Earth's center, the accelerometer outputs may be processed to give the roll angle. The sensitivity and accuracy may be improved with a 3-axis accelerometer over a 2-axis accelerometer due to the addition of the z-axis measurements.

The rotation sensors 55 may be rigidly mounted to the corresponding streamer 40 so that their output represents streamer roll at their current locations. The rotation sensors 55 may not be co-located with the streamer rotation devices 50. The rotation sensors 55 do not need to be co-located with any geophysical sensors 30 (although they may be in some embodiments). As used herein, sensors are considered co-located when the sensors are fixed to the same mechanical mount or otherwise cannot move relative to one another. In some embodiments, co-location with the geophysical sensors 30 may not be feasible from a cost or power consumption perspective; accordingly, it may be desirable to not have the rotation sensors 55 and geophysical sensors 30 co-located. From a measurement perspective, it may be desirable to have a less dense distribution of rotation sensors 55 than geophysical sensors 30, as the operational requirements are likely to be non-overlapping.

Streamer twist may have a significant impact on the acquired signal from the geophysical sensors 30, as the response of a particular geophysical sensor 30 or group thereof may be not only dependent on the rotation but also on the rate of change of the rotation along the particular streamer 40. Thus, it may be advantageous to know streamer twist (and have the ability to counteract the streamer twist), which may be especially important when forming groups of geophysical sensors 30 which are locally fixed vector sensors and/or when separating the rotation sensors 55 from the geophysical sensors 30. Groups of geophysical sensors 30 may be formed, for example, by summing the output of a number of geophysical sensors 30 to form an output group, for example, with reduced noise.

Figure 1:
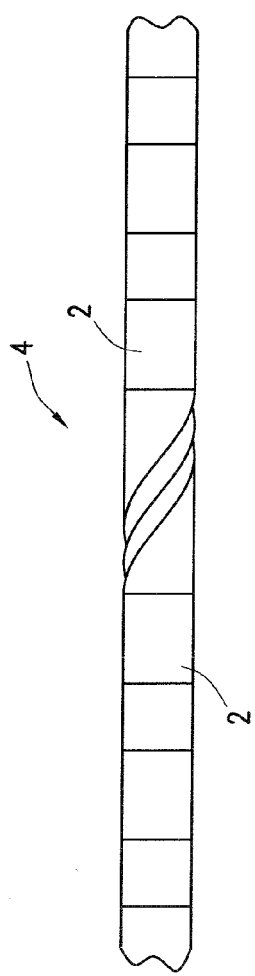
FIG. 1 shows an example streamer with twist between adjacent spacers.

The rotation sensors 55 may be spaced along the length of the streamers 40. In some embodiments, the rotation sensors 55 may have a spacing of from about 2 meters to about 50 meters on the streamers 40 or a particular section thereof. In particular embodiments, the rotation sensors 55 may have spacing of about 5 meters to about 10 meters on the streamers 40 or a particular section thereof. In some embodiments, the rotation sensors 55 may have a uniform distribution along the streamers 40 or a particular section thereof. For example, the rotation sensors 55 may be uniformly distributed over a streamer section having a length of from about 75 meters to about 150 meters in some embodiments. In some embodiments, at least 10 rotation sensors 55 and up to 20 or more rotation sensors 55 may be distributed over the streamer section. Uniformly distributing the rotation sensors 55 may allow for twist characterization up to the Nyquist frequency, assuming the number of rotation sensors 55 is twice that of the expected maximum twist rate per streamer section. The Nyquist frequency is defined as half of the sampling frequency of a digital recording system. If the sampled data contains frequencies above the Nyquist frequency, distortion due to aliasing typically occurs. In some embodiments, it may be expected that a streamer section may experience a twist rate that does not exceed 50° per meter, equivalent to 10 full rotations on a 75-meter streamer section, should the entire streamer section be twisted at the same rate. However, as seen in FIG. 1, severe twist conditions may be possible, thus requiring a denser sampling of the local twist.

Figure 4:
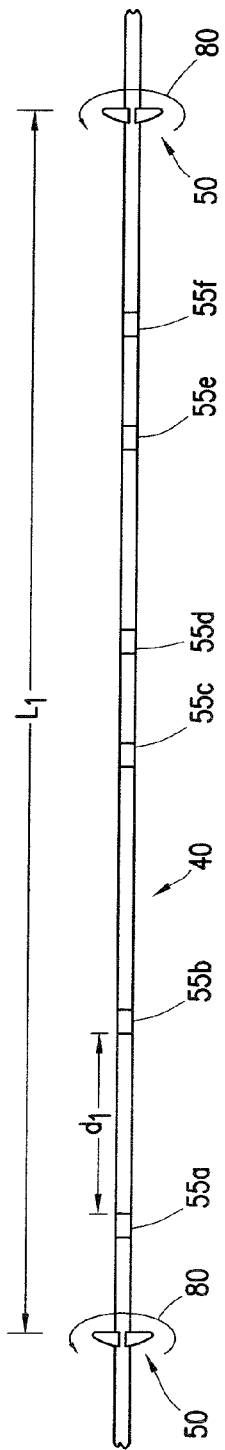
FIG. 4 shows another example portion of a streamer segment having rotation sensors and streamer rotation devices.

By acquiring rotation measurements at rotation sensors 55, the streamer twist on a streamer 40 or a particular section thereof may be determined. The streamer twist may be determined, for example, between two points on the streamer if rotation at each point and distance between the two points are both known. As will be discussed in more detail below, FIG. 4 illustrates an example portion of a streamer 40 having streamer rotation devices 50 and rotation sensors 55a-f. The distance $d_1$ between rotation sensor 55a and 55b, in some embodiments, is known. Accordingly, by acquisition of rotation measurements at rotation sensor 55a and rotation sensor 55b, the streamer twist between rotation sensors 55a, 55b may be determined. In some embodiments, the streamer twist between adjacent rotation sensors 55 may be determined, for example, using a suitable interpolation technique, such as linear or cubic spline interpolation. In particular embodiments, the streamer twist over a streamer section may not be uniform. To account for this potential non-uniformity in the streamer twist, a more robust interpolation technique such as cubic splines may be used to determine streamer twist between adjacent rotation sensors 55. Accordingly, the expected error in the streamer twist may typically be of the same magnitude as the orientation determination. As would be understood by one of ordinary skill in the art with the benefit of this disclosure, four orientation points may be used to determine the slope between a pair of adjacent rotation sensors 55. Slope may also be determined between adjacent rotation sensors 55 with only two rotation points (e.g., using linear interpolation).

In some embodiments, the geophysical survey system 5 may further include a rotation device control system 60 configured to send control signals to the streamer rotation devices 50 to untwist one or more sections of the corresponding streamer 40. The applicable rotational torque for each streamer rotation device 50 may be determined to reduce streamer twist, which may be local or global streamer twist. The rotation device control system 60 may include, for example, a processor, memory, and input/out devices. The rotation device control system 60 may be in signal communication with the streamer rotation devices 50 and rotation sensors 55, which may be a wired or wireless connection, for example. The rotation device control system 60 may also be in signal communication with the recording system 20. The rotation device control system 60 may send control signals to untwist at pre-determined periods or when a specified streamer twist has been reached. In some embodiments, the rotation device control system 60 may send signals to the streamer rotation devices 50 to cause rotation. As illustrated in FIG. 2, the rotation device control system 60 may be located on or near the survey vessel 10. Alternatively, all or a portion of the rotation device control system 60 may located within or near the streamer rotation devices 50 (for example, local rotation device control system 75 in FIG. 3). The rotation device control system 60 may receive output from the rotation sensors 55 indicative of streamer orientation. Using the output from the rotation sensors 55, streamer twist may be determined. The streamer twist may be determined locally for a particular streamer section or determined globally for an entire streamer 40. Additional input to the rotation device control system 60 may include, for example, noise data and output from the streamer rotation devices 50, such as roll counts and force data. The noise data may be noise in the output from the rotation sensors 55, which may be provided by analysis of the output by the rotation device control system 60, for example.

Figure 3:
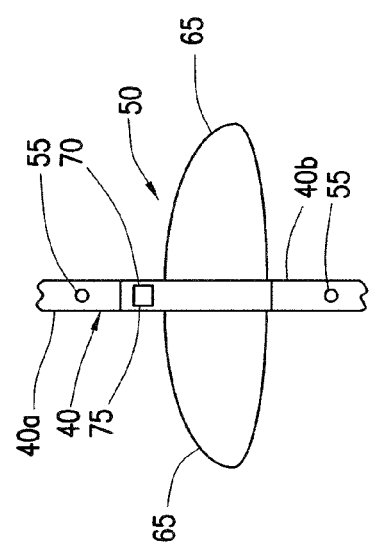
FIG. 3 shows an example portion of a streamer having rotation sensors and a streamer rotation device.

FIG. 3 shows an example portion of a streamer 40 having a streamer rotation device 50 and rotation sensors 55. As illustrated, the rotation sensors 55 may also be distributed along the portion of the streamer 40. While not illustrated, one or more geophysical sensors 30 (e.g., shown on FIG. 2) may also be distributed along the portion of the streamer 40. The streamer rotation device 50 may be disposed on the streamer 40. As illustrated, the streamer rotation device 50 may have wings 65 coupled to a device body 70. While two wings 65 are shown on FIG. 3, embodiments of the streamer rotation device 50 may comprise more (or less) than two wings 65. In some embodiments, the streamer rotation device 50 may be disposed inline between adjacent streamer sections 40*a*, 40*b*. To cause rotation, rotational torque may be introduced into the wings 65 to produce rotation of the streamer rotation device 50. Rotational torque may be introduced by, for example, introducing a wing rotation (e.g., clockwise rotation) relation to the wing axis to generate torque on the streamer 40. As the streamer rotation device 50 rotates, the rotational torque may be incrementally reduced to slow the rate of rotation until the desired rotation has been achieved. The streamer rotation device 50 may further include a local rotation device control system 75 in place of, or in addition to, the rotation device control system 60 (e.g., shown on FIG. 2). In some embodiments, the local rotation device control system 75 may function in conjunction with the rotation device control system 60 to control rotational movement of the streamer rotation device 50.

FIG. 4 shows another example portion of a streamer 40 having streamer rotation devices 50 and rotation sensors 55*a-f*, wherein the adjacent streamer rotation devices 50 are spaced along the streamer 40 a distance $D_1$. As illustrated, the rotation sensors 55*a-f* may also be distributed along the portion of the streamer 40. While not illustrated, one or more geophysical sensors 30 (e.g., shown on FIG. 2) may also be distributed along the portion of the streamer 40. In the illustrated embodiment, the streamer rotation devices 50 are spaced on the streamer 40 a distance $D_1$ of from about 100 meters to about 500 meters and, alternatively, about 200 meters to about 400 meters. In one particular embodiment, the streamer rotation devices 50 may be spaced a distance $D_1$ of about 300 meters. The rotation sensors 55*a-f* may be distributed between the pair of streamer rotation devices 50.

As previously mentioned, control signals may be sent to the streamer rotation devices 50 from the rotation device control system 60 (e.g., shown on FIG. 2) to cause their rotation, thus causing corresponding rotation of streamer 40. Rotation of the streamer rotation devices 50 is shown on FIG. 4 by arrows 80. In accordance with present embodiments, the streamer rotation devices 50 may be rotated to counteract the streamer twist. By way of example, the streamer rotation devices 50 may be rotated together or separately to institute an untwist rotation in the streamer 40. In some embodiments, different control signals may be sent to the streamer rotation devices 50 causing different amounts of rotation to be applied at each streamer rotation device 50. In other words, the streamer rotation devices 50 may each be set to provide a different rotational torque.

Figure 5:
FIG. 5 shows example roll measurements from the set of streamer segments of FIG. 4.

As previously mentioned, the rotation sensors 55*a-f* may be used to measure streamer twist. FIG. 5 illustrates roll measurements for an example portion of a streamer 40 such as that shown on FIG. 4. In FIG. 5, the roll measurements are for an example in which rotation sensors 55*a-f* may be used to provide a direct measurement of the streamer twist. In the illustrated embodiment, roll measurements at each of the rotation sensors 55*a-f* are used to determine the streamer twist over the streamer 40. Using the roll measurements, control signals may be sent to the streamer rotation devices 50 to implement an untwist operation. The untwist operation may be verified by monitoring streamer twist using the rotation sensors 55*a-f*. In other words, the streamer twist measured by the rotation sensors 55*a-f* may be used to monitor the effectiveness of the untwist operation.

Figure 6:
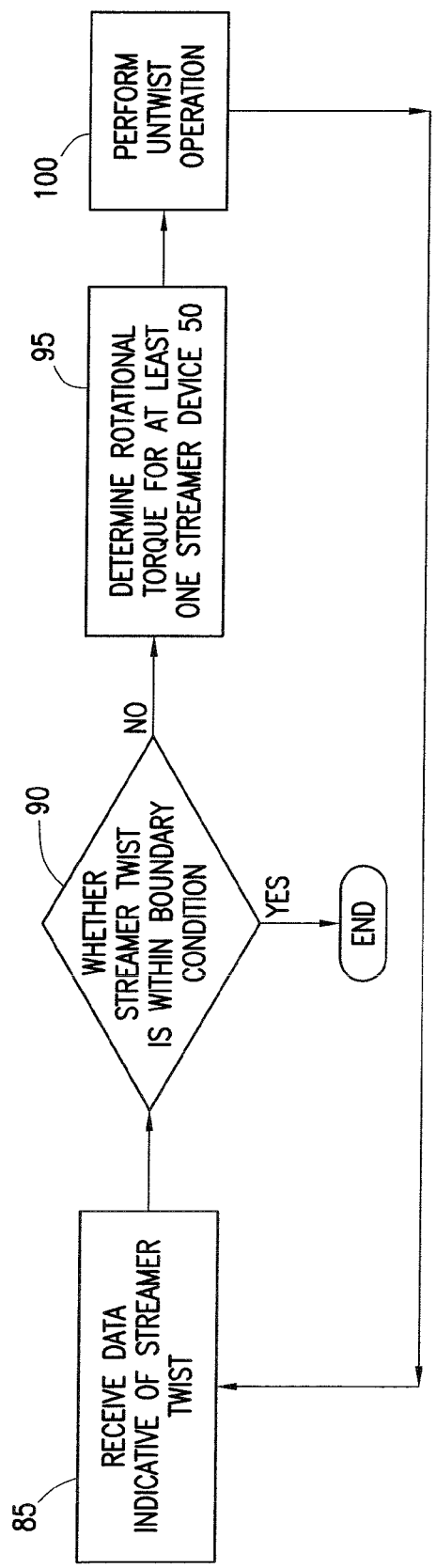
FIG. 6 shows an example method for performing a streamer untwist operation.

FIG. 6 illustrates an example method for performing a streamer untwist operation with an automated feedback loop. As illustrated, the method may include receiving (at block 85) data indicative of streamer twist. The data may be indicative of local streamer twist or global streamer twist, for example. As previously described, the data indicative of streamer twist may be received from the rotation sensors 55*a-f*, which have an output that may be representative of, or can be processed to determine, streamer orientation (rotation about its longitudinal axis) from which streamer twist may be determined. At block 90, it may be determined whether streamer twist is within boundary condition. For example, the streamer twist may be compared to a predetermined boundary condition to determine if an untwist operation is necessary. If the streamer twist is within the boundary condition, then the method may end. If the streamer twist is not within the boundary condition, then the method may further include determining (at block 95) rotational torque for at least one of the streamer rotation devices 50 to reduce streamer twist. As previously described, the rotational torque may be determined by the rotation device control system 60. The method may further including performing (at block 100) an untwist operation. By way of example, control signals may be sent from the rotation device control system 60 to the streamer rotation devices 50 causing rotation to be applied to the sensors streamer 40 at the streamer rotation devices 50. While the untwist operation is being performed, additional data may be received (at block 85). This additional data may be used in determining whether streamer twist is within the boundary condition (block 90), for example, after performance of the untwist operation. If the streamer twist is within the boundary condition, then the streamer twist operation may be ended and rotational torque provided by the streamer rotation devices 50 may be ended. However, if streamer twist is not within the boundary condition, then an adjusted rotational torque may be determined (at block 95) for one or more of the streamer rotation devices 50. By way of example, the rotational torque may be incrementally reduced to slow the rate of rotation until the desired rotation has been achieved. The adjusted rotational torque may then be used in the untwist operation being performed (at block 100).

While the preceding description describes an automated feedback routine in which streamer twist is received from rotation sensors 55 and fed to a rotation device control system 60, alternative embodiments may employ a manual feedback routine. A manual feedback routine may be desired in some embodiments for reduced complexity and to reduce unnecessary twist optimization should removing all local twist be problematic.

If there is a conflict in the usages of a word or term in this specification and or more patent or other documents that may be incorporated herein by reference, the definitions that are consistent with this specification should be adopted for the purposes of understanding this invention.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A method comprising:
   towing a streamer behind a survey vessel in a body of water, wherein the streamer comprises rotation sensors and streamer rotation devices;
   receiving data from at least one rotation sensor indicative of streamer twist; and
   rotating a portion of the streamer with at least one streamer rotation device to reduce the streamer twist based, at least in part on the data;
   wherein the rotation sensors are not co-located with the streamer rotation devices.

2. The method of claim 1 wherein the streamer rotation devices have a spacing on the streamer of about 200 meters to about 400 meters.

3. The method of claim 1 wherein at least one of the streamer rotation devices comprises a device body disposed inline in the streamer and wings coupled to the device body.

4. The method of claim 1 wherein the streamer further comprises a plurality of geophysical sensors, each geophysical sensor selected from the group consisting of a seismic sensor, a geophone, a hydrophone, an accelerometer, and an electromagnetic field sensor.

5. The method of claim 1 wherein at least one of the rotation sensors comprises a micro-electrical mechanical systems accelerometer.

6. The method of claim 1 wherein at least one of the rotation sensors comprises a 2- or 3-axis vector sensor.

7. The method of claim 1 wherein the rotation sensors have a spacing on the streamer of about 2 meters to about 50 meters.

8. The method of claim 1 wherein the rotation sensors are uniformly distributed over at least one section of the streamer.

9. The method of claim 1 further comprising determining streamer twist between at least one adjacent pair of the rotation sensors.

10. The method of claim 1 further comprising:
    detecting energy using one or more geophysical sensors disposed on the streamer; and
    producing a geophysical data product from the detected energy indicative of certain properties of subsurface rock below the body of water.

11. A method comprising:
    towing a streamer behind a survey vessel in a body of water, wherein the streamer comprises rotation sensors and streamer rotation devices;
    receiving data from at least one of the rotation sensors indicative of local streamer twist for a portion of the streamer; and
    sending a control signal to one or more of the streamer rotation devices based, at least in part, on the data, to cause rotation of at least the portion of the streamer that reduces the local streamer twist;
    wherein the rotation sensors are not co-located with the streamer rotation devices.

12. The method of claim 11 wherein the streamer rotation devices have a spacing on the streamer of about 200 meters to about 400 meters, and wherein the rotation sensors have a spacing on the streamer of about 2 meters to about 50 meters.

13. The method of claim 11 wherein at least one of the streamer rotation devices comprises a device body disposed inline in the streamer and wings coupled to the device body.

14. The method of claim 11 wherein at least one of the rotation sensors comprises a micro-electrical mechanical systems accelerometer.

15. The method of claim 11 wherein the rotation sensors are uniformly distributed over at least one section of the streamer.

16. The method of claim 11 further comprising determining streamer twist between at least one adjacent pair of the rotation sensors.

17. A system comprising:
    a survey vessel;
    a streamer coupled to the survey vessel, wherein the streamer comprises rotation sensors and streamer rotation devices; and
    a rotation device control system in signal communication with the streamer rotation devices, wherein the rotation device control system is configured to receive data from the rotation sensors indicative of streamer twist and determine a roll angle for one or more of the streamer rotation devices to reduce streamer twist;
    wherein the rotation sensors are not co-located with the streamer rotation devices.

18. The system of claim 17 wherein the streamer rotation devices have a spacing on the streamer of about 200 meters to about 400 meters, and wherein the rotation sensors have a spacing on the streamer of about 2 meters to about 50 meters.

19. The system of claim 17 wherein at least one of the rotation sensors comprises a micro-electrical mechanical systems accelerometer.

20. The system of claim 17 wherein at least one of the rotation sensors comprises a 2- or 3-axis vector sensor.

* * * * *